US012630169B2

(12) United States Patent
Pampus et al.

(10) Patent No.: US 12,630,169 B2
(45) Date of Patent: May 19, 2026

(54) METHOD AND DEVICE FOR CAPTURING INFORMATION OF A DRIVER ASSISTANCE SYSTEM

(71) Applicant: Robert Bosch GmbH, Stuttgart (DE)

(72) Inventors: Christian Pampus, Leonberg (DE); Nicolas Velz, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 136 days.

(21) Appl. No.: 18/419,029

(22) Filed: Jan. 22, 2024

(65) Prior Publication Data

US 2024/0253647 A1     Aug. 1, 2024

(30) Foreign Application Priority Data

Jan. 26, 2023     (DE) ...................... 10 2023 200 611.1

(51) Int. Cl.
B60W 50/04          (2006.01)
B60W 30/06          (2006.01)

(52) U.S. Cl.
CPC ............ B60W 50/04 (2013.01); B60W 30/06 (2013.01); B60W 2420/403 (2013.01)

(58) Field of Classification Search
CPC .................. B60W 50/04; B60W 30/06; B60W 2420/403; B62D 15/027
See application file for complete search history.

(56) References Cited

U.S. PATENT DOCUMENTS

| | | | | |
|---|---|---|---|---|
| 9,505,403 | B2 * | 11/2016 | Stefan ................... | B60W 30/06 |
| 12,067,818 | B2 * | 8/2024 | Binet ..................... | G05D 1/227 |
| 2008/0291014 | A1 * | 11/2008 | Chigusa ............... | G07C 5/0808 340/540 |
| 2016/0068158 | A1 * | 3/2016 | Elwart .................. | B60W 30/06 701/1 |
| 2016/0272244 | A1 * | 9/2016 | Imai ................... | B62D 15/0285 |
| 2021/0284181 | A1 * | 9/2021 | Song ..................... | G07C 5/008 |
| 2024/0253647 | A1 * | 8/2024 | Pampus ............... | B60W 30/06 |

FOREIGN PATENT DOCUMENTS

| | | |
|---|---|---|
| DE | 10329871 A1 | 1/2005 |
| DE | 102017008863 A1 | 5/2018 |
| DE | 102021107938 A1 | 10/2022 |
| WO | 2020056331 A1 | 3/2020 |
| WO | 2021175568 A1 | 9/2021 |

* cited by examiner

*Primary Examiner* — Donald J Wallace
*Assistant Examiner* — Mahmoud M Kazimi
(74) *Attorney, Agent, or Firm* — NORTON ROSE FULBRIGHT US LLP

(57)          ABSTRACT

A method and a device for capturing information of a parking assistance system of a vehicle. The method includes storing of information which is used during operation of the parking assistance system in a memory; provision of a parking assistance function by the parking assistance system; detecting whether a condition, of one or more predefined conditions, is fulfilled, and an at least partial provision of the information stored in the memory in response to the condition being fulfilled.

15 Claims, 1 Drawing Sheet

METHOD AND DEVICE FOR CAPTURING INFORMATION OF A DRIVER ASSISTANCE SYSTEM

CROSS REFERENCE

The present application claims the benefit under 35 U.S.C. § 119 of German Patent Application No. DE 10 2023 200 611.1 filed on Jan. 26, 2023, which is expressly incorporated herein by reference in its entirety.

FIELD

The present invention relates to a method for capturing information of a parking assistance system of a vehicle.

BACKGROUND INFORMATION

As part of the development of driver assistance systems, in particular the development of parking assistants, measurement data, such as traces, are required in at least one of the following cases:

In a first case, to analyze and rectify errors, wherein the behavior of the driver assistance system is tracked using recorded traces and the causes of undesired behavior are identified. The trigger for such a process is usually a corresponding anomaly that has been noticed and documented at an OEM or supplier, usually by a competent person.

In a second case, for the design and optimization of system behavior on the basis of a large and broad database, e.g., for the purpose of environment detection, where a balanced system behavior is usually to be achieved for a large number of scenarios. The creation of the correspondingly required database is usually initiated by a developer as part of the development and application process for the respective driver assistance system and carried out by a competent person.

In the development of application software for end users on computer systems, appropriate mechanisms are provided for the analysis of problems that may arise during the use of the software by the end user, e.g., program crashes, which enable the user to send a corresponding error report to the publisher of the software so that they can incorporate appropriate improvements for future updates or versions.

Due to the complexity and high degree of dependency on environmental influences, the mechanisms for transmitting a fault report conventional from the field of development of application software are currently not used in the development of driver assistance systems, especially in the area of parking assistance systems. A corresponding collection of data about some system behavior is typically done by a competent person. The resulting data sets can therefore only represent a limited proportion of the cases in which a corresponding system is actually operated in widespread use, i.e., in series operation by the end user.

An aim of the present invention is to create a possibility that allows such a data set to be expanded to include cases and scenarios that could not be recorded during the development of a system, for example.

German Patent No. DE 10329871 A1 describes a method for telemetric diagnosis of electronic devices of a vehicle.

PCT Patent Application No. WO 2020/056331A1 describes a method for obtaining training data.

German Patent Application No. DE 10 2017 008 863 A1 describes a method for operating a vehicle by means of a driving profile, wherein location-based driving profiles concerning the driving behavior of a plurality of vehicles are collected.

PCT Patent Application No. WO 2021/175568 A1 describes a method for preparing data sets containing at least one time series.

SUMMARY

A method according to an example embodiment of the present invention for capturing information of a parking assistance system of a vehicle comprises storing information used in an operation of the parking assistance system in a memory, providing a parking assistance function by the parking assistance system, detecting whether a condition, of one or more predefined conditions, is fulfilled, and at least partially providing the information stored in the memory in response to the condition being fulfilled.

A device according to an example embodiment of the present invention for capturing information of a parking assistance system of a vehicle, comprising a control unit which is set up to store information in a memory which is used during operation of the parking assistance system, to provide a parking assistance function by the parking assistance system, to detect whether a condition, of one or more predefined conditions, is fulfilled, and to at least partially provide the information stored in the memory in response to the condition being fulfilled.

According to an example embodiment of the present invention, the information used during operation of the parking assistance system is stored in a memory. The information is preferably stored in accordance with the first-in-first-out principle (FIFO). The information used during the operation of the parking assistance system is therefore available in the memory over a certain time range, where the time range extends up to the occurrence of the condition. The memory is preferably a ring memory.

As a result, the first condition can be used to make a preselection that defines when the information used during operation of the driver assistance system is provided. Thus, a preselection is made and the resulting data volume is reduced. This makes it possible to collect information about the driver assistance system, wherein specifically defined scenarios are mapped and the relevant information is provided.

According to an example embodiment of the present invention, a parking assistance function is provided by the parking assistance system. Preferably, the parking assistance function is a moving of the vehicle to a parking space or detection of a parking space. Optionally, the process performed by the driver assistance system is a moving of the vehicle to a parking space together with detecting the parking space, which typically occurs before moving the vehicle to the parking space. It is also advantageous if a maneuver of parking or leaving a parking space is divided into individual sections and the method is carried out for one of these sections. The amount of data can be further reduced in this way. The parking assistance function therefore does not necessarily comprise all the functions necessary for complete execution of a parking process.

According to an example embodiment of the present invention, a detection is performed of whether a condition, of one or more predefined conditions, is fulfilled. It is thus at least monitored whether a condition occurs. A plurality of conditions can also be monitored in parallel to detect whether one of these conditions is fulfilled. In other words, this means that optionally several triggers can be defined for the at least partial provision of the information stored in the memory when it is detected whether a condition, of a plurality of predefined conditions, is fulfilled. Alternatively, only a single trigger is defined for the at least partial provision of the information stored in the memory when it is detected whether a condition from a set of predefined conditions is fulfilled. In other words, detection then takes place of whether a predefined condition is fulfilled.

An at least partial provision of the information stored in the memory takes place in response to the condition being fulfilled. This means that not necessarily all the information stored in the memory is provided. A selection can also be made by which certain information stored in the memory is selected and then provided. The information is provided in response to the condition being fulfilled. Here the information at least partially provided is that stored in the memory when the condition occurs. The at least partial provision can take place in different ways, wherein the information takes place, for example, by storage for a later readout or via a transmission by means of an interface.

Preferred developments of the present invention are disclosed herein.

Preferably, according to an example embodiment of the present invention, the one or more predefined conditions comprise a condition that is fulfilled when the parking assistance function provided by the parking assistance system is terminated, in particular if the parking assistance function executed by the parking assistance system is successfully completed, or is aborted before its completion.

According to an example embodiment of the present invention, it is advantageous if the condition defines that the parking assistance function executed by the parking assistance system is successfully completed. It is thus possible to detect complete operations that have been executed without errors. Such information can, for example, be provided as training data for a machine learning method.

According to an example embodiment of the present invention, it is advantageous if the condition defines that the parking assistance function executed by the parking assistance system is aborted before its completion. The aborting of the parking assistance function can be done by any condition, by a user, the driver assistance system, or an external system. In this way, information can be captured in a targeted manner regarding scenarios in which the parking assistance system was not able to completely provide the desired support.

Preferably, according to an example embodiment of the present invention, the one or more predefined conditions comprise a condition that is fulfilled when a predefined user input occurs, in particular when the parking assistance function performed by the parking assistance system is aborted by a user, or an evaluation, realized by a user, of the performed parking assistance function is within a predefined evaluation range.

According to an example embodiment of the present invention, it is advantageous if the condition defines that the parking assistance function executed by the parking assistance system is aborted by a user. There is an aborting of the parking assistance function by the user in a parking assistance system for example if an intervention is made by the user in the longitudinal transverse control of the vehicle. In this way, scenarios can be captured in which there is presumably an incorrect support by the parking assistance system which has led to an aborting of the process by the user.

According to an example embodiment of the present invention, it is advantageous if the condition defines that an evaluation, realized by the user, of the executed parking assistance function is within a predefined evaluation range. For example, after a successful or interrupted execution of a parking assistance function by the parking assistance system, a user query is provided by which an evaluation of the last-executed parking assistance function is made by the user. If the evaluation of the user is below a reference value, for example, then the at least partial provision of the information stored in the memory takes place.

Preferably, according to an example embodiment of the present invention, the one or more predefined conditions comprise a condition which is fulfilled when an error occurs when the parking assistance function is provided, in particular when a software sequence of the parking assistance system leads to an error, and conflicting information is detected by sensors of the parking assistance system, or invalid information is detected by a sensor of the parking assistance system. Information about scenarios that lead to errors during the operation of the parking assistance system can thus be collected in a targeted manner.

If the condition is selected so that it occurs when a process in the software of the parking assistance system leads to an error, it is possible to capture such scenarios, which lead to software errors, in the information provided.

The condition is preferably selected such that it occurs when conflicting information is detected by sensors of the parking assistance system. Thus, for example during operation of the parking assistance system the information of two sensors is used. Such sensors often both detect a common property from the environment of the vehicle, for example the height of an obstacle in the environment of the vehicle. If the two sensors indicate different properties for the same object, for example a different height for the same object in the environment of the vehicle, the information of the sensors is conflicting.

The condition is preferably selected so that it occurs when invalid information is detected by a sensor of the parking assistance system. A validation of the information of a sensor can for example be detected by an analysis of a time curve of the information provided by a sensor. For example, jumps in the measured value detected by a sensor indicate that the information is not valid.

The one or more predefined conditions preferably comprise a condition which is fulfilled when it has been detected that the vehicle has been parked manually, although an automatic parking maneuver would have been available. This choice of condition allows conclusions to be drawn about the use of the system or situations in which the system is not yet being used.

The one or more predefined conditions preferably comprise a condition which is fulfilled when it has been detected that it has been recognized that the vehicle has been parked manually and no automatic parking guidance by the parking assistance system was possible. This condition makes it possible to increase the availability of the system using data from scenes that are not yet supported. In this case, the parking process must be detected through a plausibility check (e.g., a maneuvering process took place that ended with P gear).

Preferably, according to an example embodiment of the present invention, the one or more predefined conditions comprise a condition that is fulfilled when a parking assistance function provided by the parking assistance system intervenes in the driving event without previous driver action, in particular when the parking assistance function executed by the parking assistance system performs an (emergency) braking process for the purpose of avoiding a collision. Thus, situations that result in critical driving situations can be analyzed.

The information used during operation of the parking assistance system preferably comprises one or more of the following items of information: input signals of the parking assistance system, internal signals of the parking assistance system, and/or output signals of the parking assistance system. Input signals of the parking assistance system are in particular those signals that are transmitted to the parking assistance system via sensors, a user, or other vehicle systems. Internal signals of the parking assistance system are, in particular, communication signals between individual components of the parking assistance system or software signals of the parking assistance system. Output signals of the parking assistance system are in particular those signals that are provided to a user output or to a control system of a vehicle system.

Further preferably, when detecting whether a condition of one or more predefined conditions is fulfilled, it is detected whether a predefined first condition or a predefined second condition is fulfilled, selected information is extracted from the information stored in the memory in response to the predefined first condition or the predefined second condition being fulfilled, wherein the selected information is selected as a function of whether the predefined first condition or the predefined second condition is fulfilled, and the selected information is provided during the at least partial provision of the information stored in the memory. For example, when there is an occurrence of the predefined first condition, input signals of the driver assistance system can be provided and, when there is an occurrence of the predefined second condition, internal signals of the driver assistance system can be provided. Specific parameters of the driver assistance system can thus be provided depending on the triggering of the provision.

Preferably, the at least partial provision of the information stored in the memory takes place via a radio interface. The radio interface is preferably a mobile radio interface, a V2X interface or a WLAN interface. This allows the information to be provided even if the vehicle is not taken for a vehicle service.

According to an example embodiment of the present invention, it is also advantageous if an image is captured which shows the environment of the vehicle during the provision of the parking assistance function or when the condition is present, and the image is provided together with the information stored in the memory in response to the predefined condition being fulfilled. An image of the situation that led to the presence of the first condition is thus captured. This can make it easier to interpret sensor data since, for example, interfering factors in the vehicle's environment can be identified.

Preferably, the one or more predefined conditions can be configured via a radio interface. For example, it is possible for a manufacturer to configure the condition or conditions variably so that those situations are detected, and the associated information of the driver assistance system is provided that requires further investigation.

The device according to an example embodiment of the present invention is preferably set up to carry out the method according to the present invention.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
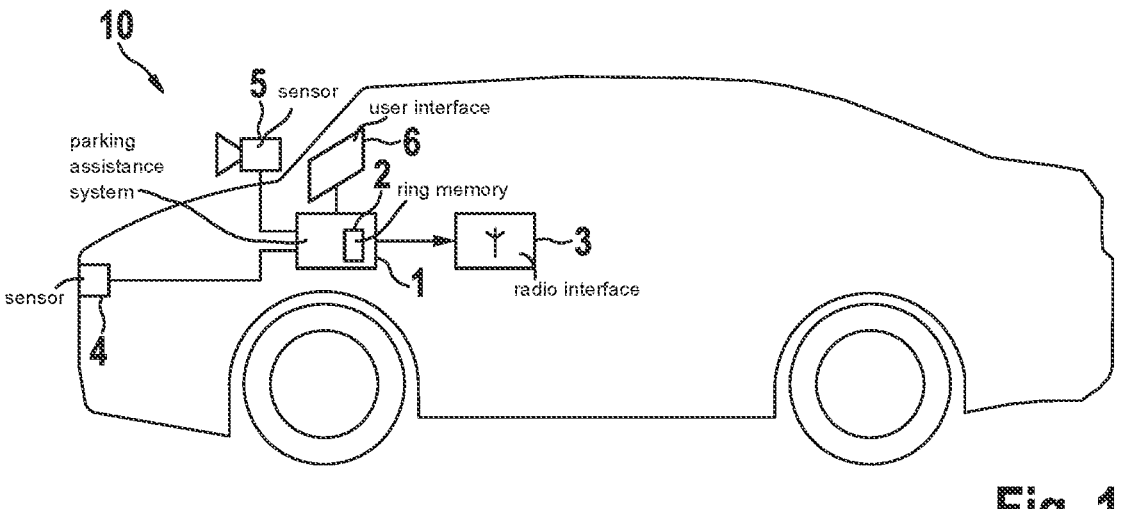
FIG. 1 shows a schematic representation of a vehicle with a device according to an example embodiment of the present invention for capturing information of a parking assistance system.

FIG. 1 shows a vehicle 10 which comprises a device for capturing information of a parking assistance system 1. The parking assistance system provides a parking assistance function that provides support for a driver during a parking maneuver of the vehicle 10 or enables autonomous parking of the vehicle 10.

The device comprises a control unit which is set up to carry out a method 100 according to the present invention for capturing information of the parking assistance system 1. The control unit is for example a digital computing unit. The control unit is optionally a component of the driver assistance system 1.

Figure 2:
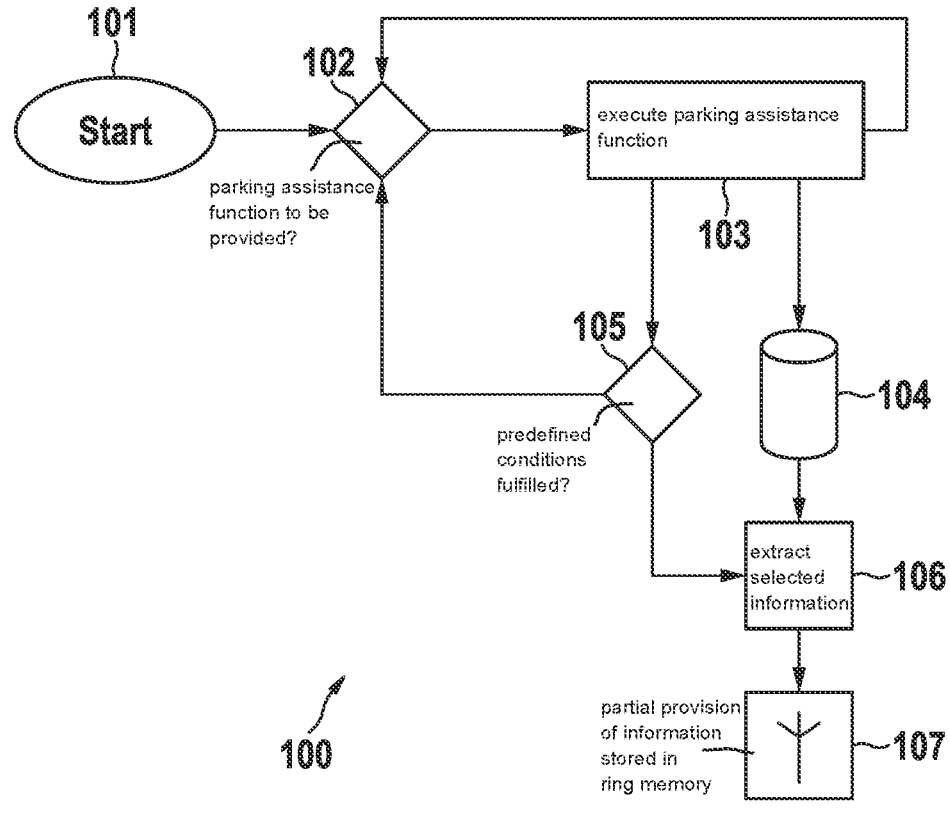
FIG. 2 shows a schematic representation of a flowchart of a method for capturing information of a parking assistance system, according to an example embodiment of the present invention.

An exemplary flowchart of the method 100 is shown in FIG. 2. In a first step 101, the method 100 is initiated. This takes place for example when the parking assistance system 1 is started up, which happens for example when the vehicle 10 is started.

In a second step 102, it is checked whether a parking assistance function is to be provided by the parking assistance system 1. This can be, for example, by manually requesting the parking assistance function or by automatically requesting the parking assistance function based on a detected trigger condition. For example, detection of a parking space can be requested when the vehicle 10 falls below a certain speed. In the same way, it can be detected that the vehicle 10 is to be moved to the parking space if this is indicated by a user input.

If it was detected in the second step 102 that the execution of the parking assistance function is desired, then in response to this the parking assistance function is executed by the parking assistance system 1 in a third step 103. If the execution of the parking assistance function has been successfully completed, the method 100 branches from the third step 103 back to the second step 102.

During the execution of the parking assistance function in the third step 103, information is continuously stored in a memory in a fourth step 104, executed in parallel. In this embodiment, the memory is a ring memory 2. The information can optionally be stored exclusively during the execution of the parking assistance function in the third step 103. The information here is the information that is used during operation of the parking assistance system 1. Thus, in particular the information is input signals of the parking assistance system 1, internal signals of the parking assistance system, and/or output signals of the parking assistance system 1. For example, in the ring memory 2, incidental sensor signals are stored, internal operating parameters of the parking assistance system 1 are stored, or control signals output by the parking assistance system 1 are stored.

The storing of the information in the ring memory 2 takes place in particular when the parking assistance function is executed. For example, if the parking assistance function is the moving of the vehicle 10 to a parking space, then, while the vehicle 10 is being moved to the parking space, the information used by the parking assistance system during this process is continuously written to the ring memory 2. The information is considered to be used if it is provided in any way to the parking assistance system 1, arises during its operation, or is output by it. Information that arises during the operation of the parking assistance system 1 is therefore continuously stored in the ring memory 2. It is initially unimportant whether this information is of interest for a later analysis or not.

The ring memory 2 works according to the FIFO principle, i.e. the first-in/first-out principle. This means that the most recently used information of the parking assistance system 1 is always stored in the ring memory 2.

In order to recognize whether the information stored in the ring memory 2 is of interest for further analysis, in a fifth step 105 it is detected whether one of a plurality of predefined conditions is fulfilled.

The plurality of predefined conditions preferably comprise at least one condition that is fulfilled when the parking assistance function provided by the parking assistance system 1 is terminated. One of the conditions can be fulfilled, for example, whenever the parking assistance function performed by the parking assistance system 1 is successfully completed. Thus, for example the condition can be the presence of a software signal that indicates the completion of the executed parking assistance function. One of the conditions can also be fulfilled, for example, whenever the parking assistance function carried out by the parking assistance system 1 is aborted before it is completed. The condition can thus be for example the presence of a software signal that indicates an interruption of the executed parking assistance function.

Because the predefined first condition indicates that the parking assistance function executed by the parking assistance system 1 has ended, during the detection of the existence of the first condition, information is stored in the ring memory 2 that describes this last-executed process of the driving assistance system 1. Based on the information stored in the ring memory 2, an analysis of the driver assistance system 1 during the provision of the parking assistance function is enabled.

The multiple predefined conditions preferably comprise at least one condition which is fulfilled when a predefined user input is made and thus a certain interaction between the user and the parking assistance system takes place. Thus, for example the predefined user input takes place in that the parking assistance function executed by the parking assistance system 1 is aborted by the user. This can be done, for example, by an input via a human-machine interface, which terminates the parking assistance function. Such a user input can also be made by an intervention in a longitudinal transverse steering of the vehicle 10 by the user, which leads to a deviation from a trajectory or movement of the vehicle 10 specified by the parking assistance function. Here one of the conditions can also be fulfilled, for example, whenever an evaluation, realized by a user, of the executed parking assistance function is within a predefined evaluation range. For example, after the parking assistance function has ended, a user can be asked to evaluate the parking assistance function that was performed. Depending on the evaluation, the condition is fulfilled or not.

The plurality of predefined conditions preferably comprise at least one condition that is fulfilled when an error occurs in the provision of the parking assistance function. For example, one of the conditions can be fulfilled whenever a software sequence of the parking assistance system leads to an error. The error can be detected, for example, by the elapsing of a timer, an interrupt, or an indicator provided for this purpose. One of the conditions can also be fulfilled, for example, whenever conflicting information is detected by sensors 4, 5 of the parking assistance system 1. Thus, for example, the parking assistance system 1 comprises a first sensor 4, which is an ultrasonic sensor, and a second sensor 5, which is a camera. The two sensors 4, 5 detect distances to objects in the environment of the vehicle 10, for example. If the two sensors 4 and 5 arrive at different recorded results for the same object, conflicting information is present. One of the conditions can also be fulfilled, for example, whenever invalid information is detected by one of the sensors 4, 5 of the parking assistance system 1. For example, repeated abrupt changes in distance information detected by the first sensor 4 that are not based on a natural movement could thus be detected. It can therefore be determined that the first sensor 4 is detecting invalid information, which can also lead to aborting the parking assistance function.

The plurality of predefined conditions preferably comprise at least one condition that is fulfilled when it has been detected that the vehicle has been manually parked, although an automatic parking maneuver would have been available. For example, a user was shown via a user interface 6 that an automatic parking maneuver can be started, but the user did not use this option.

The plurality of predefined conditions preferably comprise at least one condition which is fulfilled when it has been detected that it has been recognized that the vehicle has been parked manually and no automatic parking guidance by the parking assistance system 1 was possible. For example, a parking maneuver is detected based on the movements of the vehicle 10 or when the vehicle 10 is parked and it is checked whether automatic parking guidance was last performed. If this is not the case, the condition is fulfilled.

Preferably, the one or more predefined conditions comprise at least one condition that is fulfilled when a parking assistance function provided by the parking assistance system 1 intervenes in the driving event without previous driver action, in particular when the parking assistance function executed by the parking assistance system performs an (emergency) braking process for the purpose of avoiding a collision. For example, the presence of an activation signal of a brake assistance system is selected as a condition.

It is possible to analyze situations that have occurred when one of the predefined conditions is fulfilled, based on the information stored in the ring memory 2. For this purpose, in a seventh step 107 a partial provision of the information stored in the ring memory 2 takes place in response to one condition of the plurality of predefined conditions being fulfilled. Optionally, during the provision of the information stored in the ring memory, all the information stored in the ring memory 2 is provided. The information can be used for, among other things, machine learning, or to improve software or hardware of the parking assistance system 1.

Optionally, an extraction 106 takes place of selected information from the information stored in the ring memory 2. In this case, in the seventh step 107 a partial provision of the information stored in the ring memory 2 takes place in response to a condition of the plurality of predefined conditions being fulfilled, wherein the selected information is provided. This means that, depending on other parameters, the information available in the ring memory 2 is evaluated and only the selected information that is considered relevant based on these further conditions is provided.

The provision of the information stored in the ring memory 2 is preferably a provision of the information stored in the ring memory 2 via a radio interface 3. Thus, the information stored in the ring memory 2 or the selected information is transmitted for example to a manufacturer or a service partner via the radio interface 3. The at least partial provision of the information stored in the ring memory 2 can alternatively or additionally also be an internal provision of the stored information. For example, the information can be transferred from the ring memory 2 to a permanent memory so that it can be transferred at a later time.

If it was determined in the fifth step 105, based on a condition, that the parking assistance function executed by the parking assistance system 1 was aborted, i.e., was not fully executed, the method 100 branches back to the second step 102.

In order to enable an even more precise analysis of a situation in which a fulfilled condition was detected in the fifth step 105, an image is preferably captured showing the environment of the vehicle 10 during execution of the parking assistance function. Thus, for example an image is captured by the second sensor 5, i.e., the camera, when the parking assistance function is ended. This image is preferably provided together with the information stored in the ring memory. Based on the image, it is possible, for example, to detect why a parking assistance function was aborted, or what led to conflicting information from sensors 4, 5 or invalid information from sensors 4, 5.

Preferably, in the detecting of whether a condition of one or more predefined conditions is fulfilled, at least one predefined first condition and at least one predefined second condition are checked. Here the predefined second condition is different from the predefined first condition and is checked in parallel. Depending on whether the first predefined condition or the second predefined condition is fulfilled, a different extraction of selected information from the ring memory 2 is performed in the sixth step 106. This means that, depending on which of the conditions has been regarded as fulfilled, different information is extracted from the ring memory 2 and provided. For example, in the event of an error in a sequence of the parking assistance system 1 software, internal signals of the driving assistance system 1 are extracted as selected information and, if conflicting sensor information is present, input signals of the driving assistance system 1 are extracted. Since only the extracted and thus selected information is provided, the resulting data volume can thus be reduced, and an analysis of the situation can nevertheless take place, since the information relevant for this purpose is provided.

A possibility is thus created that allows a detected data set to be expanded to include cases and scenarios that could not be recorded during, for example, the development of a system. For this purpose, data is collected when the information is provided. This makes it possible to optimize a corresponding system based on a broader database using corresponding statistics, or to set optimization priorities based on the actual priorities of use. Corresponding statistical data are particularly advantageous when conflicting optimization goals have to be weighed (trade-off).

The overall aim of the present invention is thus to enable a targeted optimization of the user experience, so that, for example, parking spaces in critical scenes can be detected more reliably, or implausible incorrect braking can be avoided more frequently when driving freely. For this purpose, the present invention described below provides a method with which the required data sets can be collected in a bandwidth-optimized and resource-optimized manner.

The method preferably consists of a plurality of steps:

a) Executing the driver assistance function for parking. In particular, the data required for the evaluation of the triggers and the storage are generated here. These data include, for example, input signals of the parking function (e.g., sensor data), internal signals (e.g., input data from the sensor data processing in the parking function), output signals of the parking function (e.g., brake command) or external data as a reference (e.g., GPS position, image of the scene).

b) Recording/buffering of the data generated in step (a) so that they are available over a sufficient period of time and can then be deleted. A method suitable for this purpose can be realized, for example, by means of ring buffers.

c) Checking of suitable conditions as triggers for the collection, by means of at least one predefined condition. Such a trigger can, for example, be a (successfully or unsuccessfully) completed manual or automated parking process, or the intervention of a maneuver function (e.g., braking command or steering recommendation intervention). In addition, the presence of implausible data can also be used as a trigger, e.g., if the vehicle drives over an object classified as "high" (and therefore not capable of being driven over) or an area classified as not passable. On a similar basis, it would also be possible to evaluate the sensor information, e.g., to check whether different sensor types (e.g., ultrasound and camera) perform a conflicting height classification for the same object. Alternatively, a trigger by the end user themselves would also be possible, which can be initiated by the end user for example in certain situations, e.g., the query "How satisfied are you with the executed parking maneuver?" or can be initiated independently of the situation.

d) Optionally, an extraction of the recorded data from the buffered data history is made as a function of the trigger event present. If, for example, a parking space has not been detected, in this case in particular the data used in the parking space detection must be stored permanently.

e) Transmission of the data recorded in step (c) or extracted in step (d). Various mechanisms which are already used for conventional methods can be used for this purpose. The data can be transmitted for example online and permanently via mobile radio (or generally via V2X communication) or alternatively, for example, during a service visit to a workshop via a (standardized) diagnostic interface or the like.

The data collected and processed during the steps can additionally be anonymized, pseudonymized or deleted during all these steps, if necessary.

In addition to the above written disclosure, reference is explicitly made to the disclosure of FIGS. 1 and 2.

What is claimed is:

1. A method for capturing information of a parking assistance system of a vehicle, comprising the following steps:

continuously storing, in a ring memory of the vehicle: (a) input signals that includes sensor signals of a sensor system of the vehicle, (b) internal signals generated by the parking assistance system for performing parking assistance, and (c) output signals of the parking assistance system that automatedly control drive operations of the vehicle during provision of the parking assistance, wherein the ring memory is configured to continuously overwrite previously stored signals during operation of the parking assistance system until one of a plurality of predefined conditions is satisfied;

detecting whether one of the plurality of predefined conditions is fulfilled, the plurality of predefined conditions comprising at least two different conditions corresponding to different respective operating scenarios of the parking assistance system; and in response to detecting that one of the plurality of predefined conditions is fulfilled:

selecting one of a plurality of predefined subsets of the stored signals depending on which of the plurality of predefined conditions has been detected, wherein the subsets differ from one another with respect to predetermined temporal intervals of the stored signals relative to a time of fulfillment of the detected predefined condition and with respect to signal types of the stored signals;

extracting from the ring memory the selected one of a plurality of predefined subsets of the stored signals; and storing and/or transmitting the extracted subset of the stored signals.

2. The method according to claim 1, wherein the plurality of predefined conditions include a condition that is fulfilled when a parking assistance function provided by the parking assistance system is successfully completed.

3. The method according to claim 1, wherein the plurality of predefined conditions include a condition that is fulfilled when a parking assistance function executed by the parking assistance system is prematurely terminated by a user prior to completion of the parking assistance function.

4. The method according to claim 1, wherein the one or more predefined conditions include a condition that is fulfilled when the vehicle has been manually parked, although an automatic parking maneuver is recognized as having been available.

5. The method according to claim 1, wherein the one or more predefined conditions include a condition that is fulfilled when a parking assistance function provided by the parking assistance system intervenes in a driving event to perform, without previous driver action, an emergency braking process for avoiding a collision.

6. The method according to claim 1, wherein the one or more predefined conditions include a condition that is fulfilled when an error occurs in a provision of a parking assistance function, the error occurring by a software sequence of the parking assistance system leads.

7. The method according to claim 1, wherein method includes the transmitting of the extracted subset of the stored signals, and the transmitting takes place via a radio interface.

8. The method according to claim 1, further comprising:

capturing an image which shows an environment of the vehicle during provision of a parking assistance function or when the predefined condition is present, and providing the image together with the extracted subset in response to the predefined condition being fulfilled.

9. The method according to claim 1, wherein the plurality of predefined conditions are configured via a radio interface.

10. The method according to claim 1, wherein the plurality of predefined conditions include a condition that is fulfilled when a parking assistance function is aborted before completion of the parking assistance function.

11. The method according to claim 1, wherein the plurality of predefined conditions include a condition that is fulfilled when a value of an evaluation by a user, which evaluates a parking assistance function performed by the parking assistance system, is within a predefined evaluation value range.

12. The method according to claim 1, wherein the one or more predefined conditions include a condition that is fulfilled when the vehicle has been manually parked and that no automatic parking guidance by the parking assistance system was possible is recognized by the parking assistance system.

13. The method according to claim 1, wherein the one or more predefined conditions include a condition that is fulfilled when, in a provision of a parking assistance function, conflicting information is detected by sensors of the parking assistance system.

14. The method according to claim 1, wherein the one or more predefined conditions include a condition that is fulfilled when, in a provision of a parking assistance function, invalid information is detected by a sensor of the parking assistance system.

15. A device for capturing information of a parking assistance system of a vehicle, comprising:

a control unit comprising at least one processor; and a ring memory;

wherein the control unit is configured to:

continuously store, in the ring memory of the vehicle:
(a) input signals that includes sensor signals of a sensor system of the vehicle, (b) internal signals generated by the parking assistance system for performing parking assistance, and (c) output signals of the parking assistance system; that automatedly control drive operations of the vehicle during provision of the parking assistance, wherein the ring memory is configured to continuously overwrite previously stored signals during operation of the parking assistance system until one of a plurality of predefined conditions is satisfied;

detect whether one of the plurality of predefined conditions is fulfilled, the plurality of predefined conditions comprising at least two different conditions corresponding to different respective operating scenarios of the parking assistance system; and in response to detecting that one of the plurality of predefined conditions is fulfilled:

select one of a plurality of predefined subsets of the stored signals depending on which of the plurality of predefined conditions has been detected, wherein the subsets differ from one another with respect to predetermined temporal intervals of the stored signals relative to a time of fulfillment of the detected predefined condition and with respect to signal types of the stored signals;

extract from the ring memory the selected one of a plurality of predefined subsets of the stored signals; and store and/or transmit the extracted subset of the stored signals.

* * * * *